United States Patent
Takagi et al.

[15] 3,677,381
[45] July 18, 1972

[54] HYDRAULIC CLUTCH WITH DUMP VALVE

[72] Inventors: Takeshi Takagi; Tamio Kawamoto; Toshio Miyazaki, all of Yokohama, Japan

[73] Assignee: Nissan Motor Company, Limited, Yokohama, Japan

[22] Filed: June 2, 1970

[21] Appl. No.: 42,697

[30] Foreign Application Priority Data

June 30, 1969 Japan..................................44/51680

[52] U.S. Cl..............................192/106 F, 91/442, 137/517
[51] Int. Cl.......................................................F16d 25/00
[58] Field of Search......................137/517; 192/85, 85 AA; 91/442

[56] References Cited

UNITED STATES PATENTS

| | | | |
|---|---|---|---|
| 3,301,142 | 1/1967 | Cenko | 192/106 F |
| 3,362,481 | 1/1968 | Steinhagen | 192/106 F |

*Primary Examiner*—Benjamin W. Wyche
*Attorney*—McCarthy, DePaoli, O'Brien & Price

[57] ABSTRACT

Means for regulating the fluid pressure in a clutch servo mechanism of an automatic transmission for automotive vehicles, said means comprising an orifice control valve device having a center plate, a plurality of radial extensions extending radially from the center plate, and arms circumferentially extending from each of the radial extensions and tilted axially, which arms serve as spring means to regulate the closing and opening of the valve device.

5 Claims, 7 Drawing Figures

Patented July 18, 1972  3,677,381

INVENTORS
TAKESHI TAKAGI
TAMIO KAWAMOTO
TOSHIO MIYAZAKI
ATTORNEYS

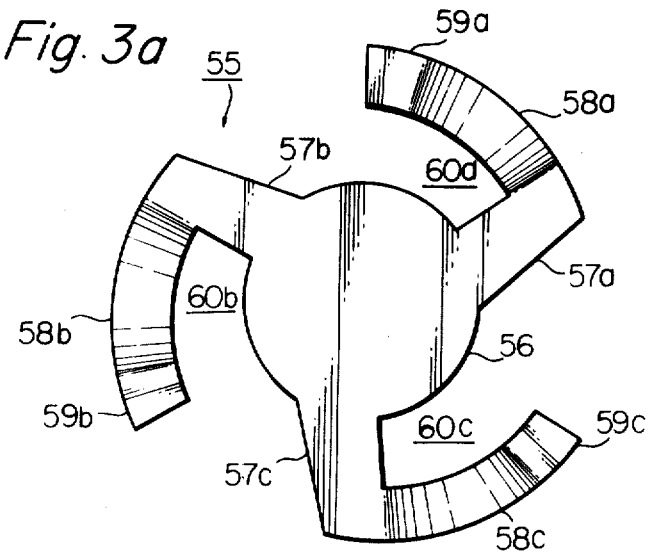
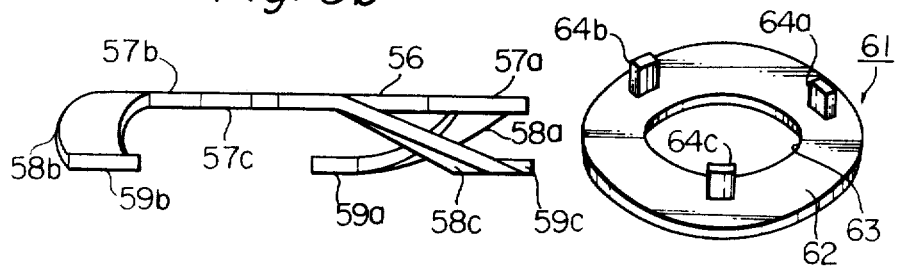
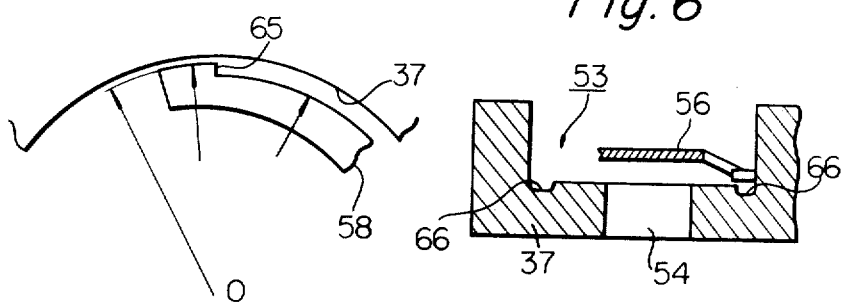

HYDRAULIC CLUTCH WITH DUMP VALVE

This invention relates to an automotive transmission and more particularly to a clutch for use in the transmission.

In an automotive automatic transmission including a servo mechanism for engaging and disengaging hydraulically operated clutches to provide selected gear ratios, an operating fluid to be applied on the piston which forms part of the servo mechanism is caused to rotate when a clutch disengages to produce in the fluid a centrifugal force which acts upon the piston to force the clutch to couple. The fluid pressure existing then is usually insufficient to meet with a desired torque transmitting capacitor of the clutch and hence would often cause slippage and seizure of the clutch.

To eliminate this problem, there have hitherto been proposed a number of methods and means. One prior-art example is the use of an orifice control valve which forms part of the clutch servo mechanism. The orifice control valve has an aperture positioned adjacent the outer periphery of the piston. The aperture is closed under the influence of fluid pressure, when the clutch engages, so as to prevent drainage of the fluid pressure and is held open, when the clutch disengages and the fluid pressure is released, to allow any residual fluid to escape through the aperture and to thereby prevent prevailency of inadequate fluid pressure due to the centrifugal action.

Such a prior-art orifice control valve is usually constructed inclusively with a hard and rigid ball or reed member which is relatively costly. Since the ball member, where used, is usually made of hard material, the servo body with which the ball member is used subject to early abrasion.

It is, therefore, an object of the invention to provide an improved check valve device which will excell the prior-art orifice control valve used in a clutch servo mechanism for an automatic transmission.

In the drawings:

FIG. 3a is a plan view of a preferred form of an orifice control valve embodying the invention;

FIG. 3b is a partial side elevation of the same;

FIG. 4 is a perspective view of a valve retaining means for use with the valve shown in FIGS. 3a and 3b;

FIG. 5 is another form of an orifice control valve embodying the invention; and

FIG. 6 is a still another form of a valve according to the invention.

Like reference numerals and characters refer to like parts in the several figures of the drawings.

Figure 1:
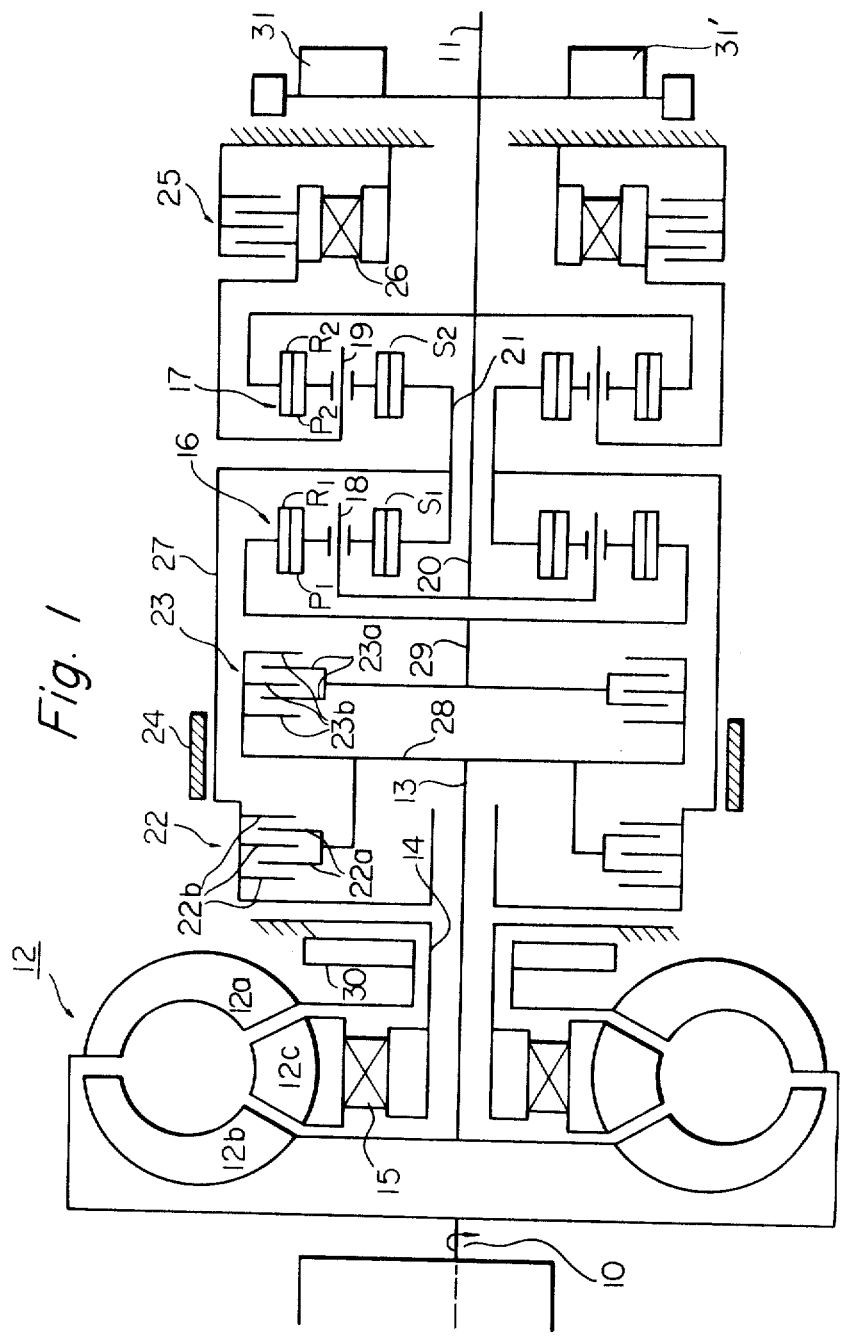
FIG. 1 is a diagram schematically illustrating a power train of a typical automatic transmission to which the invention is directed.

The power train as shown in FIG. 1 is exemplified as using two planetary gear sets providing three forward and one reverse speeds for illustrative purposes but it will be understood that the device according to the invention may be used with any other types of power trains so far as the same is operated by a hydraulic pressure.

Now, the power train shown in FIG. 1 starts with a drive shaft 10 which is connected to and driven by a prime mover (not shown) such as an internal combustion engine and terminates with an output shaft 11 which is connected to and drives a propeller shaft (not shown). The input power which the drive shaft 10 receives from the prime mover is torque modulated by a torque converter 12 having a propeller or pump 12a, turbine 12b and stator 12c as customary. The torque converter 12 may be replaced with a fluid coupling, if desired.

The input power in the drive shaft 11 is carried to the propeller or pump 12a and imparts a torque to the turbine 12b which is fast on an input shaft 13. The stator 12c is secured to a stationary shaft 14 through a one-way brake 15, which serves to prevent the stator 12c from rotating in the direction opposite to the direction of rotation of the drive shaft 10.

The power thus imparted to the turbine 12b is then carried to first and second planetary gear sets which are generally represented by numerals 16 and 17, respectively. The planetary gear sets 16 and 17 have rotary members including respectively outer ring gears $R_1$ and $R_2$ which are internally toothed, planet pinions $P_1$ and $P_2$ which are externally meshing with the ring gears, and sun gears $S_1$ and $S_2$ externally meshing with the planet pinions. These rotary members are all rotatable concentrically about a common axis which, in the gear train exemplified in FIG. 1, is in line with a rotary shaft 20 connected to the pinion carrier 18. As illustrated by way of example, the sun gears $S_1$ and $S_2$ of the first and second planetary gear sets 16 and 17, respectively, are connected rigidly to each other through a hollow shaft 21. The pinion carrier 18 is connected rigidly to the ring gear $R_2$ of the second planetary gear set 17 through the shaft 20 and further to the output shaft 11.

Friction elements are provided which includes first and second friction clutches 22 and 23, respectively, first and second friction brakes 24 and 25, respectively, and a one-way brake 26 which is combined with the second brake 25.

The first clutch 22 is shown as operatively connected between the input shaft 13 and the hollow shaft 21 through a brake drum 27 and the second clutch 23 is operatively connected between the input shaft 13 and the ring gear $R_1$ of the first planetary gear set 17 through a disc member 28 integral with the input shaft 13 and an intermediate shaft 29, as shown. The first brake 24 is operatively connected between the clutch 22 and the hollow shaft 21 and is forced, when applied, against the brake drum 27 to hold the sun gears $S_1$ and $S_2$ stationary when applied. The second brake 25, on the other hand, is operatively connected to the pinion carrier 19 of the second planetary gear set 17 and, when applied, holds the planet pinions $P_2$ stationary. The one-way brake 26 acts to prevent the pinion carrier 19 from rotating in the direction opposite to the normal direction of rotation of the drive shaft 10.

Represented by numeral 30 is a source of pressurized fluid, which source may actually be an oil pump, and by numerals 31 and 31' are governor valves supplying fluid pressures proportional to the revolution speeds of the output shaft 11.

The conditions of the friction elements and the speeds selected therein are illustrated in the following table.

| Selected Position | Gear Ratio (example) | Clutch 22 | Clutch 23 | Brake 24 | Brake 25 |
|---|---|---|---|---|---|
| Forward First | 2.45 | − | + | − | − |
| Forward Second | 1.45 | − | + | + | − |
| Forward Third | 1.00 | + | + | − | − |
| Forward Low (1st) | 2.45 | − | + | − | + |
| Reverse | 2.18 | + | − | − | + |

In this table, the sign "+" is intended to mean that the related friction element is actuated and the sign "−" to mean that the friction element is released.

Figure 2:
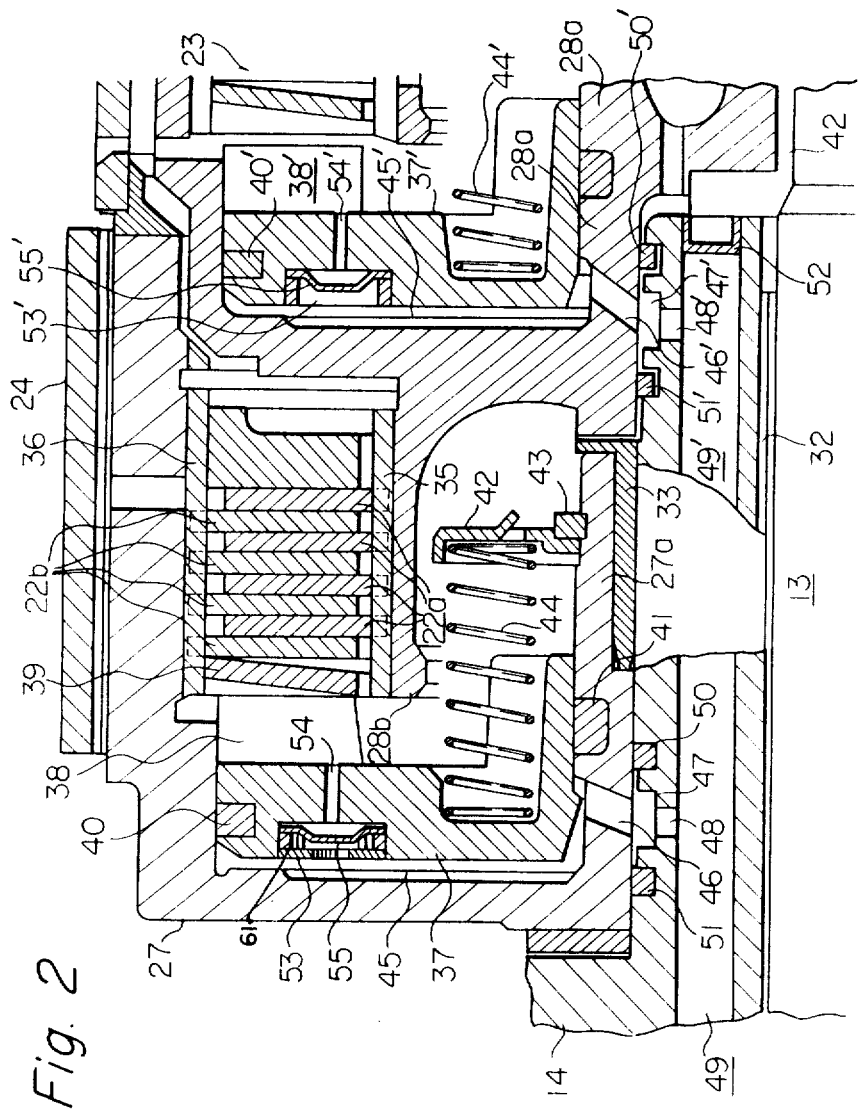
FIG. 2 is a cross-sectional view of part of the power train of FIG. 1.

In FIG. 2, there is shown an upper half of the section of the power train of FIG. 1, which power train is shown to include the clutches 22 and 23 and brake 24. The input shaft 13 is rotatably disposed in the stationary shaft 14 through a bush 32. On the stationary shaft 14 is rotatably carried a centrally cylindrical part 27a forming part of the drum 27 through a bush 33. The disc member 28 is secured by means of a spline 34 to the input shaft 13 and has interconnected therewith a cylindrical part 28a in slidable contact with the outer periphery of the stationary shaft 14 and another cylindrical part 28b extending into the drum 27. On the part 28b is mounted clutch discs 22a by means of serrations 35 so that these discs may slide in the axial direction. Mounted on the inner periphery of the drum 27 by means of serrations 36 are clutch discs 22b which are axially slidable and disposed for frictional contact with the mating discs 22a.

An annular piston 37 is disposed within a hollow space defined between the inner periphery of the drum 27 and the centrally cylindrical part 27a and arranged to reciprocate in the axial direction. The piston 37 has an extension 38 having a cushoning member 39 made of a resilient conical plate and positioned relative to that clutch disc 22b which is closest thereto, as shown. Designated at 40 and 41 are seal rings for the piston 37.

An annular plate member 42 is secured by means of a snap ring 43 to the part 27a of the drum 27. A compression spring 44 is inserted between the plate member 42 and the piston 37 and adapted to bias the piston 37 away from the plate member 42. A space 45 is formed behind the piston 37, which space communicates with the pressurized fluid source or pump 30 (FIG. 1). This communication is provided by a passage 46 formed in the cylindrical part 27a, an annular groove 47 and port 48 formed in the outer periphery of the stationary shaft 14, and a passage 49 extending axially through the stationary shaft 14 and leading from a hydraulic control valve not illustrated. Designated by reference numerals 50 and 51 are seal rings, and by numeral 52 is a plug closing on an end of the passage 49'.

The piston 37 is provided, according to the invention, with an orifice control valve of the type shown in FIGS. 3a and 3b.

The piston 37 has its outer face recessed to provide a valve receiving space which is an annular recess as at 53. This annular recess 53 is formed with a flat bottom wall which centrally communicates with a passage 54 extending through the structure of the piston 37 and terminating at the opposite face thereof.

An orifice control valve 55 to be accommodated in the recess 53 is made up of, as seen in FIGS. 3a and 3b, a center plate 56, a plurality of radial extensions which are shown as three in number by numerals 57a, 57b and 57c and extending substantially radially outward of the centerplate, and curved arms 58a, 58b, and 58c respectively extending from the extensions 57a, 57b and 57c in the circumferential direction of said center plate and vertically bending with respect to the radial extensions. The arms 58a, 58b and 58c normally hold the center plate in its disengagement position with the flat bottom wall of the recess to provide fluid communication between the recess and the source of hydraulic pressure when said clutch serve is released and are engageable with said flat bottom wall of said recess to interrupt that fluid communication when said clutch servo is applied. Furthermore, the arms 58a, 58b and 58c are respectively formed with flat end portions 59a, 59b and 59c which are parallel with the center plate and extend from the curved arms in the circumferential direction of the center plate. The flat end portions are to be placed on the flat bottom wall forming a valve seat in the recess 53. The valve 55 is preferably made of resilient material so that the arms 58a, 58b and 58c serve as spring means. Spaces 60a, 60b and 60c are thus formed as illustrated in FIG. 3a.

FIG. 4 illustrates retaining means 61 for holding the valve 55 in place within the recess 53. This retaining means comprises an annular disc member 62 having formed centrally therein a circular aperture 63 which is sized to be substantially smaller than the area of the center plate 56 of the valve 55. The annular disc member 62 has mounted on one side thereof extensions or lugs 64a, 64b and 64c which are to be inserted respectively in the spaces 60a, 60b and 60c defined between the three arms and the center plate of the valve 55 whereby the valve is grabbed in position.

Designated at 37' is a piston which is provided to actuate the second clutch 23 (FIG. 1). The piston 37' is constructed and operated essentially similarly to the piston 37 already described and, as such, the corresponding components associated therewith are denoted by corresponding reference numerals with a prime. The piston 37' is disposed in the space in the disc member 28 and arranged to actuate the clutch 23. The piston 37' is normally biased by a spring 44' to the left-hand side of the drawing. The operating fluid is passed from the passage 49' in the stationary shaft 14 through a port 49'', an annular groove 47' and a passage 46' in the disc member 28 over to the space 45' leftward of the piston 37'.

In operation, the clutch servo mechanism incorporating the improved orifice control valve of the invention will function in a manner to be described in the following.

When the clutch 22 is to be held inoperative, i.e. in disengaged position, the piston 37 is biased away from the plate member 42 by the action of the spring 44 and the orifice control valve 55 is held open by the resilience of its arms 58a, 58b and 58c. In this state, any residual fluid in the space 45, i.e. the fluid which has been forced radially outward by a centrifugal force is passed through the circular recess 53 and passage 54 into the space within the piston 37. Since the piston 37 is thus held in the position remotest from the clutch discs by the action of the spring 44, the groups of the discs 22a and 22b are held apart from each other.

When the clutch 22 is to be brought into engaged position, the fluid pressure is passed through the passage 49, port 48, annular groove 47 and passage 46 into the space 45, whereupon the center plate 56 of the orifice control valve 55 is pressed forward by the fluid pressure and thus closes on the passage 54. The piston 37 is moved by the fluid pressure against the action of the spring 44 toward the clutch discs 22a and 22b, complete with the cushioning member 39, to press the clutch discs 22a and 22b until the two groups of the clutch discs engage frictionally together.

Having thus described the invention, it will be understood that the orifice control valve means of the invention functions to ensure that, when the clutches are released, the pressurized fluid staying in the space 45 is withdrawn to prevent application the generation of a fluid pressure to the clutch discs. The valve means is constructed so as not to open radially when pressed because its circumferentially extending arms serve to keep the valve body resiliently biased in the axial direction, as has been described herein above. These features render the valve unit compact and intact with respect to the servo mechanism so that the latter is held harmless.

FIG. 5 illustrates a modification of the valve means which is arranged to ensure more firm fitting of the valve in the circular recess 53 in the piston. For this purpose, this modification includes a radially extending portion 65 which is formed on each of the end portions 59a, 59b and 59c and which peripherally fits within the circular recess 53, thereby preventing the valve 55 from moving radially therein.

FIG. 6 illustrates another modification of the valve means which is arranged specifically to reduce frictional contact between the valve 55 and the bottom wall of the recess 53. This purpose is achieved by providing an annular groove 66 extending circumferentially in the bottom wall of the recess 53 in the piston 37.

It will now be understood that the valve means disclosed herein may find wide applications where a difference occurs selectively between two working fluid pressures and that the use of the valve means is not limited to application to clutch operating mechanism of a power transmission of a motor vehicle.

What is claimed is:

1. In a hydraulic control system for an automatic power transmission including a clutch servo mechanism comprising hydraulically operated pistons and friction clutches associated therewith, an improvement which comprises a piston having formed therein an annular recess having formed with a flat bottom wall and a fluid pressure passage operatively communicating with a source of hydraulic pressure, valve means for withdrawing residual fluid pressure from the clutch servos when the clutches disengage and closing on said passage when the clutches engage, said valve means comprising a center plate, a plurality of radial extensions substantially radially extending from said center plate, and a plurality of curved arms extending from said extensions in the circumferential direction of said center plate and vertically bending with respect to said radial extensions, said curved arms normally holding said center plate in its disengagement position with the flat bottom wall of said recess to provide fluid communication between said recess and said source of hydraulic pressure when said clutch servo is released and engageable with said flat bottom wall of said recess to interrupt fluid communication between said recess and said source of hydraulic pressure when said clutch servo is applied and means for retaining said valve means in position in said recess.

2. The improvement according to claim 1, wherein each of said curved arms has at its end a flat end portion engaging with said flat bottom wall of said recess, said flat end portion being parallel with said center plate and extending from said curved arms in the circumferential direction of said center plate.

3. The improvement according to claim 1, wherein said means retaining said valve means comprises an annular disc member having uprightly extending lugs for locking said valve means in position in said recess, said disc member having formed therein an aperture which is sized to be substantially smaller than the area of said center plate.

4. The improvement according to claim 1, wherein said means for retaining said valve means comprises an annular disc member having formed centrally therein a circular aperture which is sized to be substantially smaller than the area of said center plate of said valve means and a plurality of lugs axially extending from the surface of said annular disc and adapted to be inserted into the spaces defined between said curved arms and center plate whereby said valve means is grabbed in position in said annular recess.

5. The improvement according to claim 1, wherein said recess has formed circumferentially in its bottom an annular groove which is adapted to reduce friction contact between said end portion of the curved arms and the bottom wall of said annular recess.

* * * * *